May 4, 1965 — T. GASKINS — 3,181,577

SAW FOR PALM WOOD

Filed Nov. 24, 1961 — 2 Sheets-Sheet 1

INVENTOR
Thomas Gaskins

BY Mason, Fenwick & Lawrence
ATTORNEYS

May 4, 1965
T. GASKINS
3,181,577
SAW FOR PALM WOOD
Filed Nov. 24, 1961
2 Sheets-Sheet 2
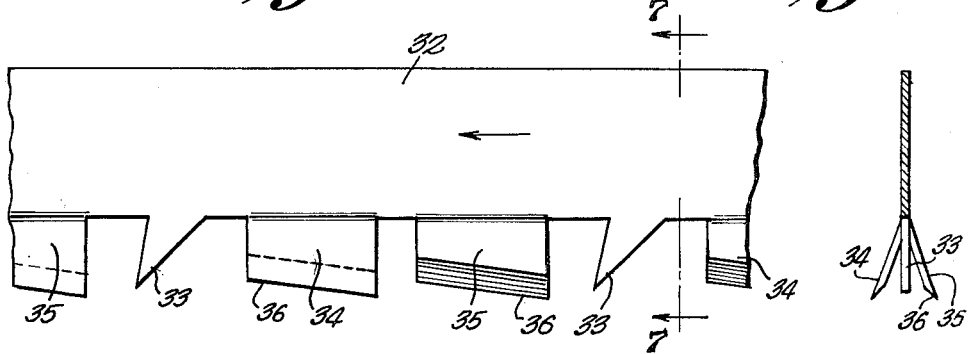
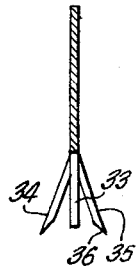
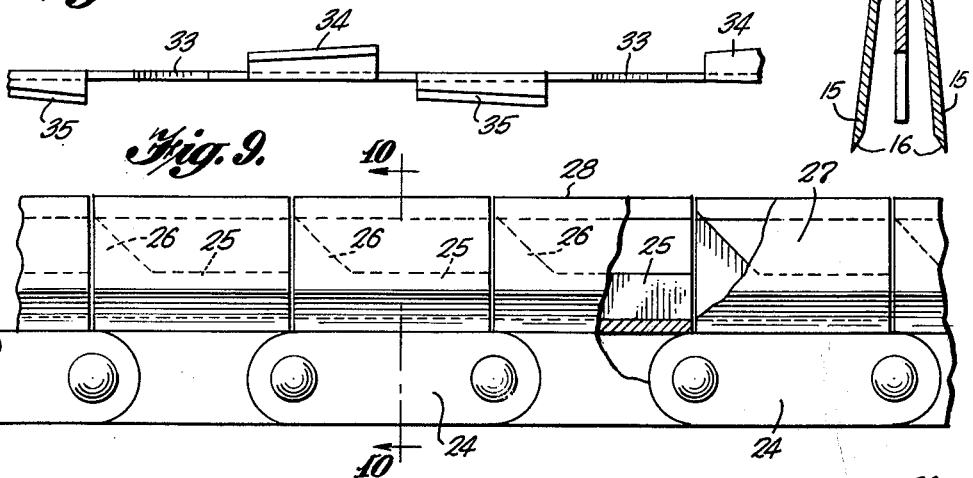
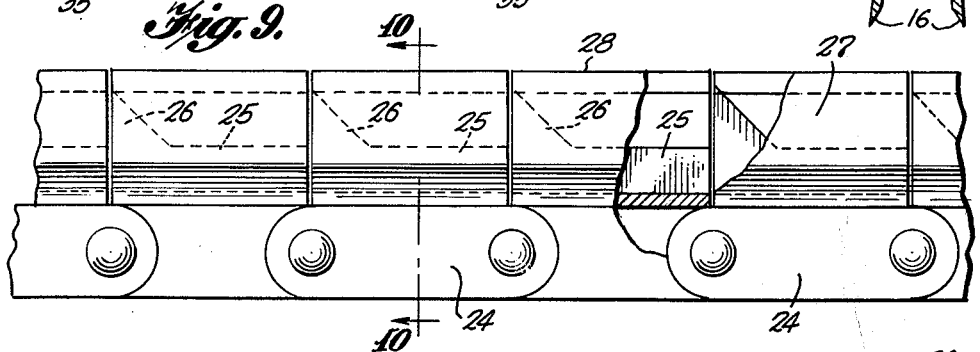
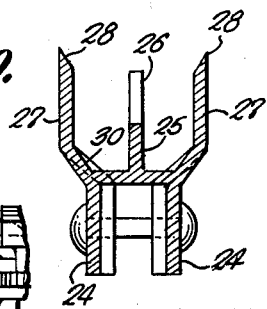
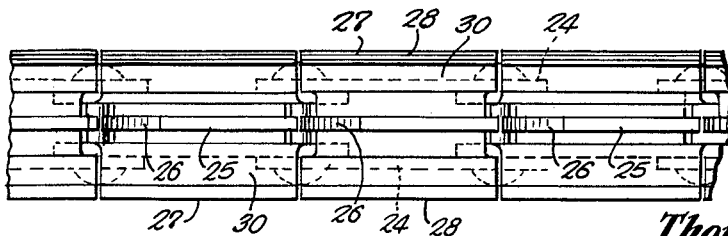
INVENTOR
Thomas Gaskins
BY Mason, Fenwick & Lawrence
ATTORNEYS United States Patent Office 3,181,577
Patented May 4, 1965

3,181,577
SAW FOR PALM WOOD
Thomas Gaskins, Palmdale, Fla.
Filed Nov. 24, 1961, Ser. No. 154,778
2 Claims. (Cl. 143—133)

This invention relates to saws, and had its inception in the endeavor to devise a saw that would more effectively cut the wood of the palm log than conventional blades, which are notoriously inefficient for this purpose, to the extent that most palm logs from clearings are burned because they cannot be satisfactorily cut.

The structure of the palm log differs from that of most other woods in that while the fibers are very tough and resilient, they are not bonded together so as to be mutually rigidly supported, but are more loosely associated so that when a fiber is impactively contacted by the tooth of a conventional saw blade, it does not hold its position and immediately break, but yields a little at both sides of the point of attack before breaking. This yielding movement diminishes the impactive character of the force delivered by the saw, and therefore requires more power to operate the saw. For the same reason, the saw is subjected to undue wear and cuts at a slow rate, dulling quickly, and in the case of reciprocating saws, the diverted portions of the fibers, which press resiliently against opposite sides of the blade, immediately the break occurs, are, upon the return stroke, frictionally drawn toward a position of alignment, exerting toggle pressure upon the blade, increasing the difficulty of its operation.

The general object of the invention is the provision of a saw blade characterized by the absence of conventional saw teeth, and providing rectilinear continuous cutting edges spaced laterally to move in closely adjacent parallel paths, designed to cut the fibers incisively equidistantly from a point in the fiber at which it would be severed by a conventional blade working in the same medial plane.

An incisive cut may be defined as the linear incision made, for example, by a knife edge drawn in the direction of its length. The conventional saw tooth is in fact a small skew chisel having sharp edged plane faces which intersect at a point and forming relatively wide angled wedges which drive wedgingly into the breach started by the point. The transverse pressure of these wedge-like teeth against the fiber is the cause of its yielding before breaking, dampening the rending effect of impact. In the case of the knife blade, the thinness of the blade and the continuity of the cutting edge minimize the factors which tend to divert the fibers adjacent the point of severance. In the saw blade of the present invention, a short length of the fiber is cut out by the laterally spaced parallel cutting edges and an intermedite row of raker teeth is provided for carrying out these severed bits.

Another object of the invention is to provide a saw blade of the type described, comprising outer laminations shaped to provide the continuous spaced parallel cutting edges, and an intermediate lamination having its working edge shaped to provide the raker teeth, the laminations being unitarily secured together.

Still another object of the invention is the provision of a saw blade having rectilinear cutting edges in spaced parallel relation, and raker teeth positioned to traverse a path intermediate the paths traversed by the cutting edges, the latter being upwardly inclined in a forward direction, so as to attack the work piece progressively, depthwise of the incisive cut.

Other objects of the invention will appear as the description of the invention proceeds.

In the drawings which accompany and form a part of the following specification, and throughout the several figures of which the same reference characters refer to identical parts:

FIGURE 6 is a view in side elevation showing the intermediate portion of another modification of the invention;

FIGURE 7 is a view in cross section taken along the line 7—7 of FIGURE 6;

FIGURE 8 is a bottom plan view of the portion shown in FIGURE 6;

FIGURE 9 is a side elevation of a portion of a chain saw blade embodying the invention;

FIGURE 10 is a view in section taken along the line 10—10 of FIGURE 9;

FIGURE 11 is a bottom plan view of the portion shown in FIGURE 9;

FIGURE 12 is a diagrammatic view in cross section showing a variant in the relationship of the cutting plates of the reciprocating, circular and chain saws, in which they are slightly flared.

Figure 1:
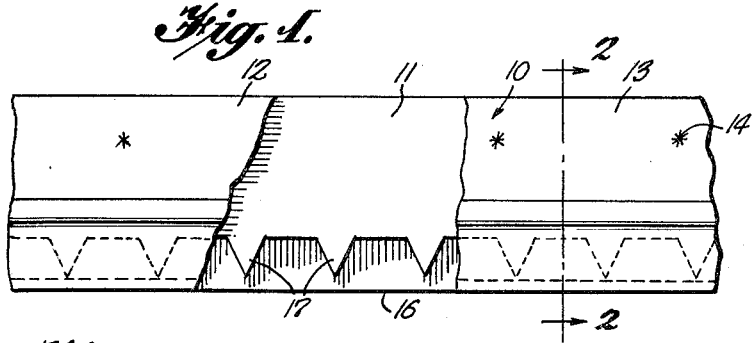
FIGURE 1 is a view in side elevation of a reciprocable saw blade embodying the principles of the invention, a portion of one side being broken away to reveal an underlying part.
Figure 2:
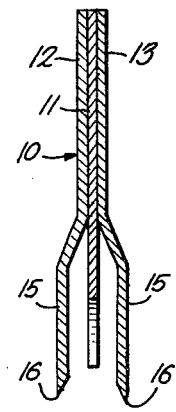
FIGURE 2 is a view in section, taken along the line 2—2 of FIGURE 1.
Figure 3:
FIGURE 3 is a bottom plan view of the saw blade shown in FIGURE 1.

Referring now in detail to the drawings, and first to FIGURES 1 to 3, the saw blade 10 is of laminated construction, consisting of three thin, resilient steel plates 11, 12 and 13, the upper portions of which are secured in surface contact, as by the spot welds 14, the lower portions 15 of the outer plates 12 and 13 being symmetrically offset to the left and right. The offset portions as shown are parallel to the upper portion of the blade, being beveled on the lower inner edges thereof to provide incisive cutting edges 16. The most significant characteristic of this saw blade is that the cutting edges are continuous throughout the working length of the blade. The lower portion of the intermediate plate 13 terminates short of the cutting edges and is formed with raker teeth 17. Since this is a reciprocating saw, the raker teeth are designed to function in both directions and have the shape of isosceles triangles. It will be understood that the edges 16 cut simultaneously and that the bits of severed fiber have a length equal to the distance between said edges. The above described blade may be used as a hand saw, but is preferably power driven; for example, as a vibratory saw having a stroke of about two inches and a rate of reciprocation of about 6000 strokes per minute.

Figure 4:
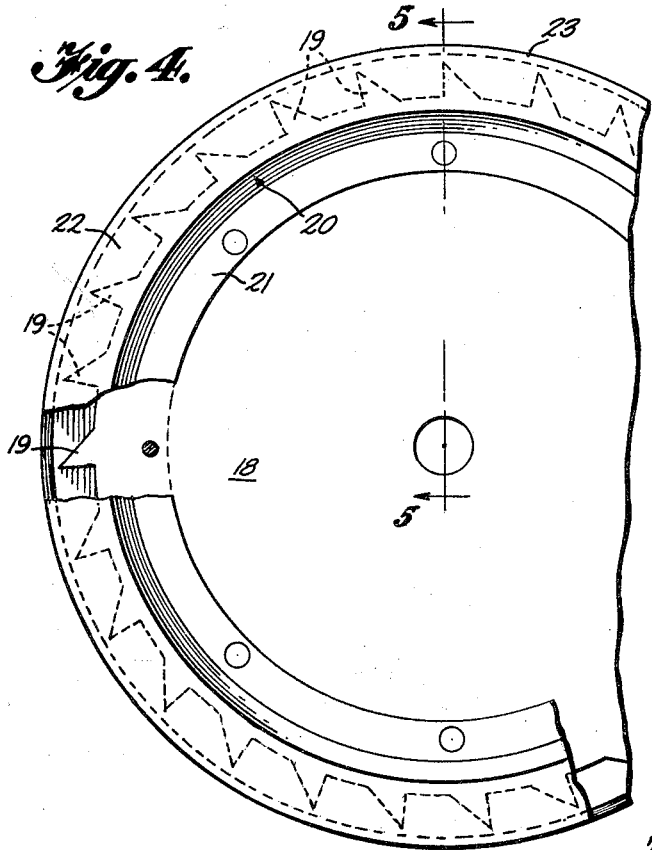
FIGURE 4 is a side elevation of the major portion of a circular saw blade embodying the invention, a portion being broken out to show the raker-tooth ring.
Figure 5:
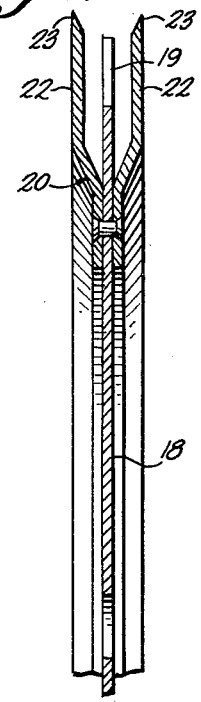
FIGURE 5 is a view in section, taken along the line 5—5 of FIGURE 4.

FIGURES 4 and 5 illustrate the invention embodied in a circular saw. In this form the intermediate plate 18 is a disk having circumferentially arranged raker teeth 19, and since the saw will be operated unidirectionally, the raker teeth 19 are formed with abrupt shoulders on the leading side. The disk plate is flanked on both sides by the concentric annular rings 20 having flat inner portions 21 that lap the disk at opposites, being in surface contact therewith. The rings have annular parallel cutting portions 22 symmetrically offset to right and left of the medial plane of the disk plate 18, being beveled on the lower inner edges thereof to provide continuous incisive cutting edges 23.

The group of FIGURES 9 to 11 illustrate the adaptation of the invention to the blade of a chain saw, which is conventionally built with wide links alternating with and lapping narrow links with which they are pivotally connected. The sides of the teeth are integrally bridged by the saw teeth. In the subject chain saw blade the cross sectional shape of the wide teeth is shown in FIGURE 10. The sides 24 are bridged by an integral structure which includes an intermediate plate 25, parallel to the sides 24, having its free edge formed with raker teeth 26. Since the chain moves unidirectionally, the raker teeth have abrupt shoulders on the leading side. The bridging structure includes also cutting plates 27 symmetrically offset to right and left of the plate 25, said plates being beveled on the lower inner edges thereof to provide rectilinear incisive cutting edges 28.

The sides 29 of the narrow links are bridged by similar integral structure, except that the inclined portions 30 which connect the sides to the parallel cutting blades 31 are longer and more widely inclined than like connecting portions of the wide links, in order to bring the cutting blades and cutting edges in precise longitudinal registry with the blades and edges of the wide links, in the straight flights of the chain. The cutting plates and edges of both wide and narrow links terminate substantially in lines perpendicular to the longitudinal dimension of the links and passing through the pivotal axis, so that throughout the straight flights of the chain the cutting edges will be, in effect, continuous.

While in the three adaptations of the invention thus far described the offset cutting blades have been specified as being parallel to the medial plane of the raker element, they may be slightly flared, as shown in FIGURE 12, to diminish the area in contact with the sides of the kerf, making the saw run easier and reducing the risk of overheating, as well as making the blades self-sharpening. The continuous cutting edges that characterize the forms of the invention thus far described produce a superior cut surface of the work piece, devoid of teeth marks and scratches, and thus adapts the saw to use in other woods than palmwood, where a smooth cut surface is desired.

Adverting now to that form of the invention shown in FIGURES 6, 7 and 8, the blade comprises a single plate 32, the direction of the cutting stroke being indicated by the arrow. The lower edge of the blade is formed with raker teeth 33 lying in the plane of the plate 32, and alternating with pairs of cutting teeth 34 and 35, offset respectively to the left and right symmetrically with respect to the plane of the raker teeth, as shown in FIGURE 7. The cutting teeth have long rectilinear edges 36 shaped to make an incisive cut. The series of leftward and rightward cutting edges are respectively in precise longitudinally alignment. The provision of a pair of teeth between each raker tooth assures that a length of fiber equal to the distance between the two rows of cutting edges will be cut out ahead of each raker tooth.

It will be noted that the rectilinear edges 36 of the cutting teeth incline upwardly in the direction of the advance end of the teeth. The advance ends being above the level of the bottom of the kerf, the edges each making contact with the bottom of the kerf at a point to the rear of the advance end, and from there on progressively, incisively deepening the kerf, to the rear end of the cutting edge which extends below the level of the raker teeth. Since the advance ends of the cutting teeth do not come into impactive abutment with the fiber, there is no shattering of the fiber, the cut is smoother, and relatively less power is required in the operation of the saw.

While I have in the foregoing description disclosed several practical embodiments of the invention, it is to be understood by those skilled in the art that the examples shown and described do not express the extent of diversification of the invention, nor do they necessarily imply any limits to the scope of the invention.

What is claimed is:

1. A saw for cutting palm wood and the like comprising a laminated blade including an intermediate plate having its working edge formed with raker teeth lying in a common plane and outer plates secured on the opposite sides of said intermediate plate having working edges extending beyond the working edge of said intermediate plate, the working edges of said outer plates being offset and disposed parallel relative to said intermediate plate, the inner sides of the working edges of said outer plates being beveled to provide incisive cutting edges disposed parallel to the direction of cutting of the saw and said raker teeth terminating short of the beveled surfaces of said outer plates.

2. A saw for cutting palm wood and the like according to claim 1, wherein the raker teeth comprise isosceles triangles.

References Cited by the Examiner
UNITED STATES PATENTS

| | | | |
|---|---|---|---|
| 238,521 | 3/81 | Osgood | 143—133 |
| 834,251 | 10/06 | Bailey | 143—135 X |
| 1,497,577 | 6/24 | Morzsa | 145—31 X |
| 1,788,456 | 1/31 | Eckersley | 143—139 X |
| 1,900,702 | 3/33 | Fisher | 143—133 |
| 2,015,877 | 10/35 | Thompson | 83—665 |
| 2,472,876 | 6/49 | Ahrndt | 143—133 |
| 2,784,751 | 3/57 | Alexander | 143—133 X |
| 2,798,517 | 7/57 | Carney | 143—135 |
| 2,946,359 | 7/60 | Debourdeau | 143—130 |

WILLIAM W. DYER, Jr., *Primary Examiner.*

WILLIAM FELDMAN, DONALD R. SCHRAN,
*Examiners.*